United States Patent [19]
Astola et al.

[11] Patent Number: 6,094,722
[45] Date of Patent: Jul. 25, 2000

[54] HIDING A AUTHENTICATION CODE IN AN ELECTRIC SIGNAL

[75] Inventors: Jaakko Astola; Pauli Kuosmanen, both of Kangasala, Finland

[73] Assignee: Nokia Technology GmbH, Bochum, Germany

[21] Appl. No.: 09/010,606

[22] Filed: Jan. 22, 1998

[30] Foreign Application Priority Data

Jan. 24, 1997 [FI] Finland ..................................... 970295

[51] Int. Cl.⁷ .................................................. G06F 17/00
[52] U.S. Cl. .......................................................... 713/176
[58] Field of Search ................................. 380/4, 5, 9, 49, 380/205, 54; 713/176, 168, 180

[56] References Cited

U.S. PATENT DOCUMENTS 5,524,933  6/1996  Kunt et al. .
5,943,422  8/1999  Wie et al. .................................... 380/5

FOREIGN PATENT DOCUMENTS 0705025  4/1996  European Pat. Off. .
9325038  12/1993  WIPO .
9527627  10/1995  WIPO .

OTHER PUBLICATIONS

Patent Abstract of Japan, vol. 012, No. 076 (P–675), Mar. 10, 1988 & JP 62 214484 A (Fujitsu Ltd), Sep. 21, 1987.
"A Digital Watermark": by Schyndel et al, 1994 IEEE, pp. 86–90 1994 IEEE.
"Applying Signatures on Digital Images" by Pitas et al. Departmetn of Informatics, Univ. of Thessaloniki, Greece, pp. 460–463.
"Towards Robust and Hidden Image Copyright Labeling" by Koch et al, Fraunhofer Institute for Computer Graphics, pp. 452–455.
"Spatial Method for Copyright Labeling of Digital Images" by Bruyndonckx, et al. Telecommunications and Microelectronics Laboratories, pp. 456–459.
"A Method for Signature Casting on Digital Images" by Pitas, Dept. of Informatics, Univ. of Thessaloniki, Greece, pp. 215–218 1996 IEEE.
"A Watermark for Digital Images" by Wolfgang et al. Computer Vision and Image Processing Laboratory, pp. 219–222 1996 IEEE.
"Hidden Signatures in Images" by Hsu et al. National Taiwan University pp. 223–226 1996 IEEE.
"A Robust Content Based Digital Signature for Image Authentication" by Schneider et al. Columbia University, pp. 227–230 1996 IEEE.
"Image Watermarking Using DCT Domain Constraints" by Bors et al. University of Thessaloniki, Greece, pp. 231–234 1996 IEEE.

(List continued on next page.)

*Primary Examiner*—Tod R Swann
*Assistant Examiner*—Matthew Smithers
*Attorney, Agent, or Firm*—Ware, Fressola, Van Der Sluys & Adolphson LLP

[57] ABSTRACT

In order to hide an authentication code or signature (101, 402, 504) in an electric signal (100, 400, 401), which consists of data parts with a certain value, certain data parts are selected from the electric signal for processing on the basis of the contents of the authentication code. The value of each data part selected for processing is re-determined by a filter (200, 403, 504), which uses certain other predetermined data parts of the electric signal as input data. For detecting the authentication coding, the signal is filtered with the same filter (403) and those data parts (406) which have their value unchanged after the second filtering are marked. The electric signal can be a file (particularly an image file) or a temporally continuous signal. The device for implementing the method comprises a memory (501, 502) for saving the electric signal and a processing unit (500) for reading the data from the memory and for changing the value of its data parts. The device also comprises a filter (503), which uses the other data parts of the signal as input data and which determines the new value of the data parts selected for processing. The device can interact with the user (506, 507) or it can be a sealed authentication coding circuit.

14 Claims, 3 Drawing Sheets

OTHER PUBLICATIONS

"Multi-Resolution Access Control Algorithm Based on Fractal Coding" by Roche et al Institut Eurecom, pp. 235–238 1996 IEEE.

"Phase Watermarking of Digital Images" by Ruanaidh et al, Dept. of Electronic and Electrical Engineering University of Dublin, pp. 239–242 1996 IEEE.

"An Image Digital Signature System with Zkip For the Graph Isomorphism" by Kinoshita.Japan pp. 247–250 1996 IEEE.

"Secure Spread Spectrum Watermarking for Images, Audio and Video" by Cox, NEC Research Institute, pp. 243–246 1996 IEEE.

"Invisible Signatures in Images Based on Nonlinear Dynamical Systems" by Dedieu, et al. Swiss Fed. Institute of Technology, pp. 163–166.

"Can Invisible Watermarks Resolve Rightful Ownerships?" by Craver et al. IBM Research Report RC, IBM, 1996.

"Robust Data Hiding for Images" by Swanson et al, University of Minnesota, pp. 37–40, 1996 IEEE.

| a | b | c |
|---|---|---|
| d | x | e |
| f | g | h |

$$x = \frac{a+b+c+d+e+f+g+h}{8}$$

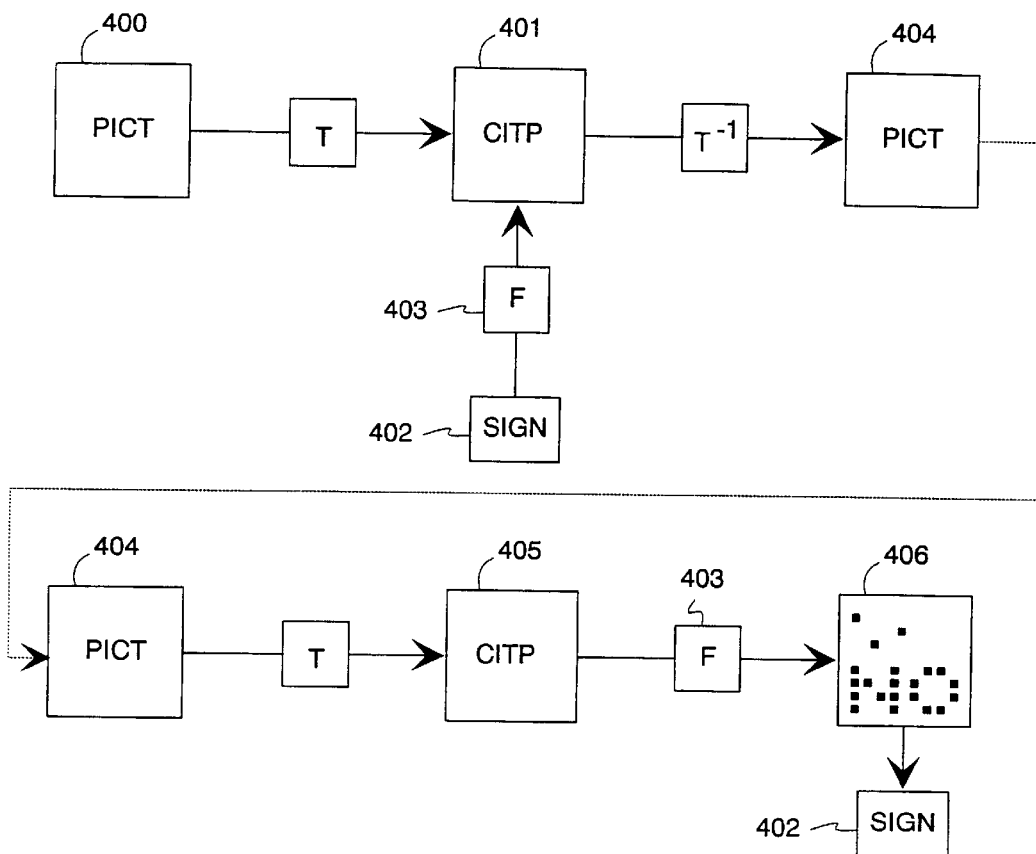
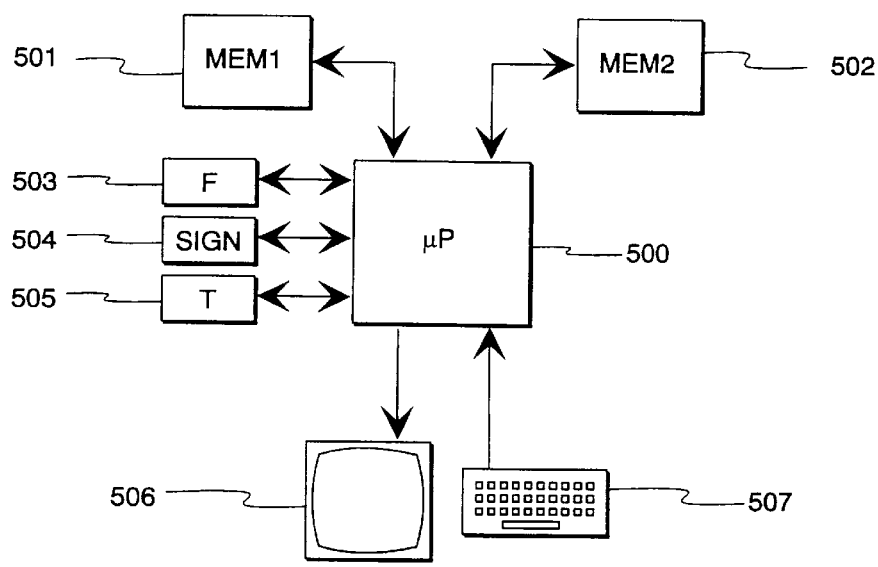
Fig. 4
Fig. 5

HIDING A AUTHENTICATION CODE IN AN ELECTRIC SIGNAL

TECHNICAL FIELD

This invention relates to adding a code indicative of ownership or other authentication code to an electric, (electronic) signal so as to make it difficult for outsiders to perceive the existence of the code and/or remove the code from the signal. The invention relates to both the method and a device for implementing the method. In this patent application, the signal used as an example is a two-dimensional image presented in electric form, particularly a still image produced by a photographic apparatus. However, the invention can also be generalized to other signal types, as will be described in more detail hereinafter.

BACKGROUND OF THE INVENTION

It is usually rather easy to copy and duplicate electrically presented information, which makes it more difficult to control that copyrights are observed. According to international agreements, copyright to a certain image belongs to the producer, (author) of the image. If the producer saves the image in the form of an electric file in a computer, which is connected to a wide information network, such as, the Internet, it is possible that another user of the network copies the image file and uses it in other contexts without paying compensation to the producer, who is entitled to it on the basis of the copyright. If the producer wants to present a legal claim for compensation, he must be able to prove that the image used elsewhere is a copy of the image produced by the person claiming compensation. It would be very important for the producer that even after the transfer and possible processing measures it would be possible to find some information indicative of the origin of the image from the file transferred in electric form. However, this information must be so hidden that a dishonest user cannot remove it or even perceive its existence.

Methods used to indicate ownership of image files can be divided into two main categories. In watermark methods, a graphic element is added to the image, which element can be isolated afterwards and shown as a graphic evidence to prove that it has been added to the image on purpose, and that it is not a random combination of parts of the image. In checksum methods, a checksum or a logical combination is calculated by a secret method from the bits and/or bytes used to present the image, and this combination is added to the image file as part of it. The origin of the image is detected by calculating the same logical combination afterwards and comparing it to the original checksum contained by the file. Because only the real owner of the image knows the correct calculation method for the checksum, the probability of getting the same sum with a method chosen at random is small.

All the above mentioned methods have the following common objectives:
- the visual quality of the image must not suffer from the addition of the authentication code to the image,
- only the producer and possibly an independent, reliable testing institution can check the authentication code hidden in an image,
- the authentication method must allow the use of many kinds of authentication codes or "signatures",
- the authentication code must remain in the image with a sufficient reliability, even if the image is packed with the JPEG or MPEG algorithm, for example, and
- the authentication code must endure attempts to pirate the images or to cover the real origin of the image.

In watermark methods, the graphic element used as a authentication code is generally called a watermark or signature. One known, watermark-type method has been presented in the publication R. G. van Schyndel, A. Z. Tirkel, C. F.

Osborne. *A Digital Watermark, Proceedings of ICIP-94*, Volume II of III, pp. 86–90, *IEEE*, Austin, Tex., 1994. For other publications dealing with prior art methods for authentication coding of images, please see the reference list at the end of the descriptive part of this application. Generally in the prior art publications, the signature is converted to a virtually random form, the pixels of which are scattered on the image to be authentication coded. A disadvantage of these methods is the fact that the calculation method is very complicated.

SUMMARY OF THE INVENTION

The object of this invention is to present a method and a device by which the above described objectives of the authentication coding of signals can be achieved easily and reliably.

The objects of the invention are achieved by attaching the signature to the original signal by a filtering method, which changes the value of the pixels or other signal parts indicated by the signature in a controlled manner.

The method according to the invention for hiding an authentication code in an electric signal is characterized in that the value of each data part selected from the signal for processing is specified anew by a filter, the input data of which consist of certain other predetermined data parts of the electric signal.

The invention also relates to a device for implementing the method described above. The device according to the invention is characterized in that it comprises a filter, and the processing unit of the device is arranged to re-determine the value of the data parts selected for processing in a manner specified by the filter.

For the sake of clarity, the following description will focus on the example in which the original signal is a two-dimensional still image, and the signature is a certain graphic element. In the method according to the invention, the signature is thus preferably a two-dimensional binary array, consisting of bits which have a value of either 1 or 0. Shown as a bit map, a signature of this kind is a two-color image (typically black and white), in which the bits with the value 1 are shown as black pixels and the bits with the value 0 as white pixels or vice versa. The signature is set "on top of" the original image as a mask at a desired point, and only the pixels which coincide with the 1-bits of the signature are selected from the original image for processing. A natural, alternative method is to select for processing only the pixels which coincide with the 0-bits in the signature. A new value is calculated for each pixel of the original image being processed with a filter, the input data of which consist of certain pixels of the original image which do not belong to the pixels being processed. When a new value has been specified for all pixels being processed, the authentication coding has been completed.

The filter, which is used to calculate new values for the pixels of the original image selected for processing, can be chosen rather freely. A filter which is advantageous with regard to the invention is such that with great likelihood it will alter the value of any randomly selected pixel, but the alteration is small. Filtering can be defined extensively as any operation in which the new value of a certain pixel or other data part is specified deterministically on the basis of the values of pixels or other data parts which are used as input data for the filter.

In order to perceive the authentication coding according to the invention, the entire authentication coded image is filtered pixel by pixel with the same filter which was used to implement the authentication coding. Because the filter is very likely to change the value of any pixel being processed, most of the values of the pixels in the image are changed. Only the pixels which had their value changed according to the filter already in the authentication coding, remain unchanged. The observer marks those pixels in the image which have not changed. If these pixels form the graphic element used as a signature, the copyright of the image has been proven.

In various modifications of the invention, the original image can be processed in many ways before the signature is added to it. One advantageous method is to use a known transformation, the reverse transformation of which is known, to process the original image. The signature is added to the transformed image with the filtering method described above, and the image thus received is reversely transformed back to the original form. The signature can also be oversampled before it is added to the original or transformed image, which in practice means that the signature is duplicated and added at several positions on the same image.

BRIEF DESCRIPTION OF THE DRAWINGS

In the following, the invention will be described in more detail with reference to the preferred embodiments presented by way of example and the accompanying drawings, in which FIG. 2 shows a filter according to the invention, FIG. 3 shows the detection of the authentication coding according to the invention, FIG. 4 shows the proceeding of an embodiment of the invention, and FIG. 5 shows a device according to one embodiment of the invention.

BEST MODE FOR CARRYING OUT THE INVENTION

Figure 1:
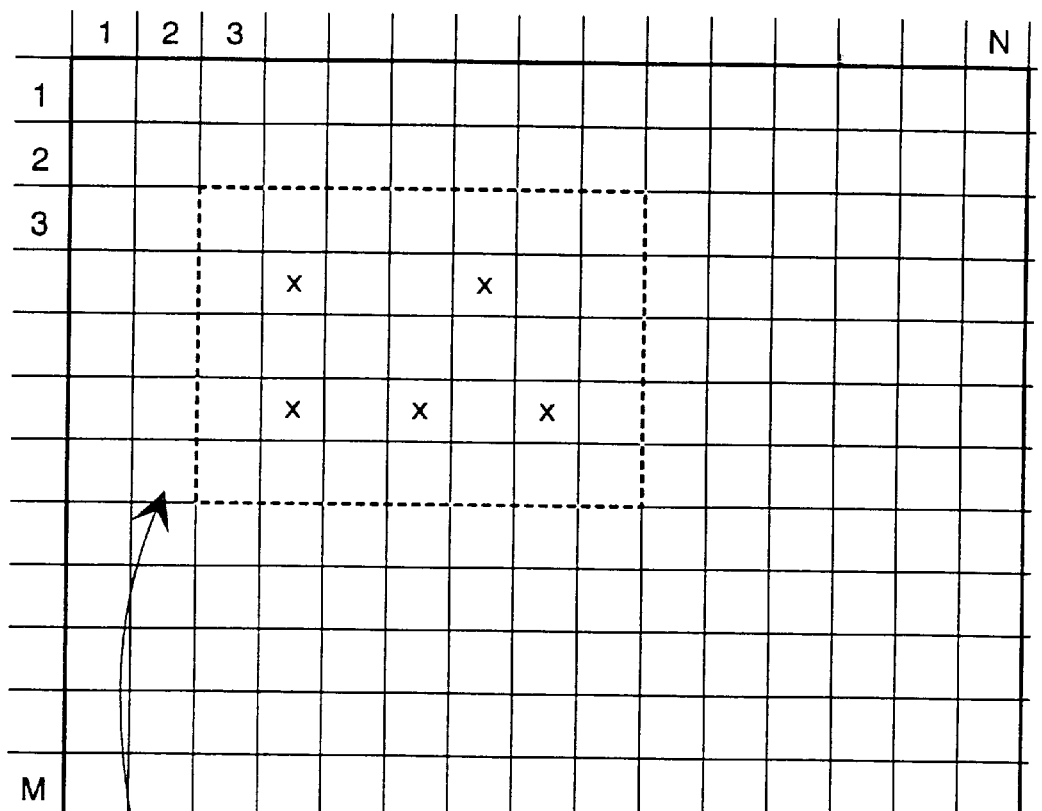
FIG. 1 shows the selection of the pixels according to the invention.
Figure 1:
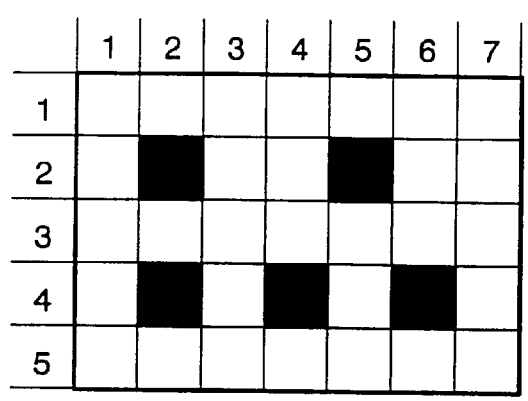

FIG. 1 shows a simple digital image 100, but for the sake of clarity, the color of its pixels is not shown in FIG. 1, and a simple binary signature 101, in which the 1-pixels are shown black and the 0-pixels white. The digital image 100 has M×N pixels, which are divided into numbered columns and lines (here M=12 and N=15). The value of each pixel is generally an 8-bit byte or a 16-bit pair of bytes. A real digital image to be authentication coded typically has hundreds of thousands or millions of pixels. A real signature is generally also much larger and more complicated than the example in FIG. 1. The size of the signature is generally H×K pixels (here H=5 and K=7). So as to make the signature fit into the image in its entirety, its size can be limited as H<M and K<N.

In authentication coding according to the simple embodiment of the invention, the person who is carrying out the coding selects from the original image 100 a location in which the signature 101 is to be placed. It is advantageous to have the location selected freely, because then the potential image pirate will not know where to look for the signature in the image. The location is preferably indicated as the coordinates of the pixel on which the pixel number (1,1) of the signature hits. Let us assume that the person who is carrying out the coding selects the location (3,3). In the example of the figure, the pixels of the original image on which the 1-pixels of the signature hit are selected for processing. In FIG. 1, these pixels of the original image are marked with x.

Figures 2, 3:
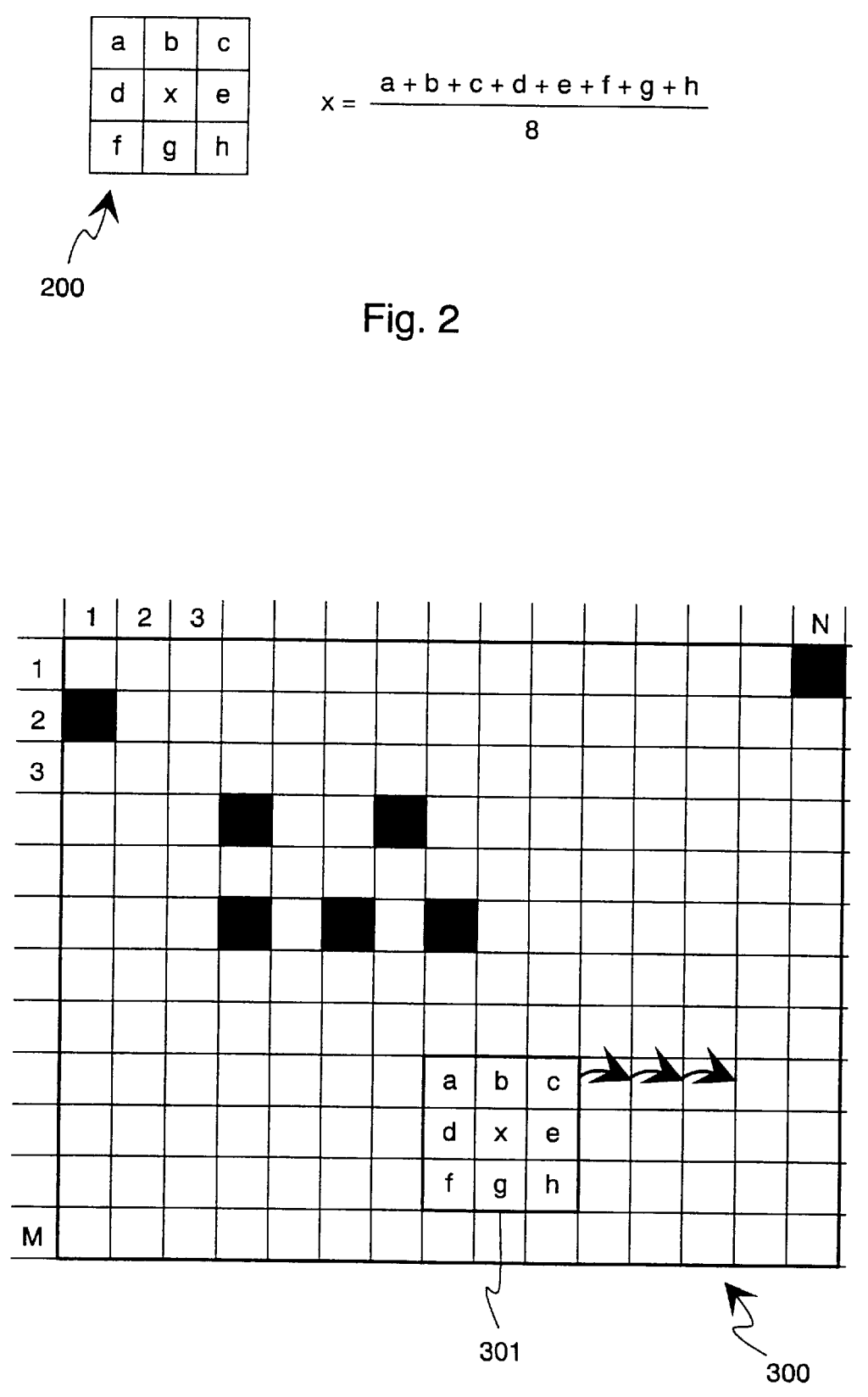

Each pixel of the original image selected for processing is processed separately by a filter, the detailed implementation of which can be freely chosen by the person who is carrying out the authentication coding. The only limitation set by the invention for the filter is that it must not use any of the selected pixels as input data. Thus the implementation of the filter is somewhat dependent on how the pixels 1 and 0 are divided in the signature. From FIG. 1 it can be seen that the signature used as an example does not contain adjacent or diagonally adjacent 1-bits, and thus the filter can use as input data for the filtering of a certain pixel all the eight pixels surrounding the pixel to be filtered, for example. FIG. 2 shows a diagram of a filter in which the filtered value of the pixel x marked with diagonal lines is the same as the mean value of all the eight pixels surrounding it. This filter is very suitable for a case like the one shown in FIG. 1.

Because the original image is typically a photograph-type image, in which many adjacent pixels are very unlikely to have exactly the same value, it is almost certain that a filter like the one shown in FIG. 2 will change the value of the pixel selected. On the other hand, radical changes of the pixel value on a length of a few pixels are rare, and so the filter shown in FIG. 2 is likely to change the value of the pixel only a little. Both of these are advantageous features with regard to authentication coding. When all the pixels of the original image selected for processing on the basis of the signature have been separately filtered with the chosen filter, the authentication coding according to the simple embodiment of the invention has been completed. If any of the pixels selected for processing had been situated very near the edge of the image, the window 200 depicting the selection of the input data had been located partly outside the image. For cases like this it is possible to define a so called wrap-around protocol, according to which transition from the pixel at the edge of the image to the area outside the image is interpreted as transition to a pixel at the opposite edge of the image (in other words, the location of the pixels in the columns is defined as modulo the number of columns and similarly in the rows modulo the number of rows).

FIG. 3 shows the detection of authentication coding in an image which has been authentication coded by a method according to the simple embodiment of the invention described above. The digital image 300 is filtered pixel by pixel with the same filter which was used to hide the signature in the original image. The frame 301 depicts the location of the selection frame of the filter input data at a certain pixel, and the arrows proceeding pixel by pixel describe the moving of the frame pixel by pixel forward, until the whole image has been filtered. The value of most pixels will change in the filtering, as has been stated above. However, the value of those pixels which have already been filtered when the signature was hidden, does not change, because filtering on the basis of the same input data pixels gives the same result both during the hiding and discovery of the signature. In addition, it can be assumed that there are some pixels in the image which happen to have such a value that it does not change during the filtering. On the basis of the filtering results, a so called detection image is formed, in which the pixels which remained unchanged in the filtering are clearly distinguished from those which had their value changed. In FIG. 3, for example, the first mentioned pixels are shown black and all other pixels white. The pixels at the points (2,1) and (1,N) of the image are randomly found pixels and other pixels marked black belong to the signature.

If the signature is a certain regular and easily recognizable graphic element and if there is a relatively small amount of randomly found "non-changing" pixels, the signature can generally be clearly seen with the naked eye in the detection image, when the whole image has been filtered. If one of these conditions is not met, the signature can be searched by statistical methods from the detection image. In practice, this is generally most easily implemented by forming a convolution of the signature and the detection image, in which the known signature is compared to each of its possible locations on the detection image, and a characteristic is calculated to describe how well the pixel content of the signature corresponds to the pixel content of the detection image in each possible location. If the highest value of the convolution shows that at the most suitable location over 90% of the pixels have the same value as the corresponding pixels of the detection image, it is relatively certain that the signature has originally been placed at the location in question. It is not possible to demand that the signature and the suspected location on the detection image are fully identical, if there is the possibility that a packing algorithm or some other factor causing loss of information has changed the contents of the image after the authentication coding.

In the simple embodiment of the invention described above the person who performs the coding can choose the signature, its location on the original image and the filter by which both the authentication coding and its detection is performed. Because the number of possible signatures is almost limitless when large images are processed and because there are many possible filters, without knowledge of the form of the signature and the filter used it is difficult even to know whether a certain image has been authentication coded or not, and to discover and remove the signature used in the coding is even more difficult. However, it is possible to think of a situation in which an image pirate gets hold of both the original, uncoded image and its authentication coded version. If the difference of these images is calculated by pixels, the signature becomes visible, because the authentication coding has only changed the value of the pixels selected on the basis of the signature, while other pixels have remained unchanged. When the signature has been found, the image pirate can perform a statistical analysis of how the values of the original image have been changed in the authentication coding, in which case it may even be possible to find out what kind of a filter was used in the coding. On the basis of this information, it is also possible to try to break the authentication coding of other images produced by the same producer.

In order to eliminate this disadvantage, another embodiment of the invention has been developed, and it will be described in the following with reference to FIG. 4. At the beginning of the coding, the original image 400 is transformed into another form 401 by the transformation T, the reverse transformation $T^{-1}$ of which is known by the person who performs the authentication coding. The signature 402 is added to the transformed image by using the filter 403 in the same way as has been described above. The transformed image, to which the signature has been added by filtering, is reversely transformed into the image 404, which otherwise corresponds to the original image 400 but in addition contains the signature in a form which is the result of the filtering 403 and the reverse transformation $T^{-1}$. When observed with the naked eye, it is usually impossible to distinguish the image 404 from the original image 400.

In order to detect the authentication coding, the image 404 is again transformed with the transformation T, resulting in the image 405. When it is filtered pixel by pixel with the filter 403, and all the pixels with an unchanged value are marked, the result is the detection image 406, from which it is further possible either to visually perceive or by statistical methods to discover the signature 402.

The transformation T can be freely chosen by the person who performs the authentication coding, as long as it is deterministic and its reverse transformation $T^{-1}$ is known. In this embodiment the person performing the authentication coding can use, in addition to the signature, its location and the filter mentioned above, a fourth factor which can be freely chosen and which makes an unauthorized detection of the signature and thereby the possibility of breaking the authentication code even more difficult. One known transformation T, which can be used as shown in FIG. 4, is a discrete cosine transformation. Another possible transformation is the division of the image (virtually randomly, for example) into two or more partial images, whereby the signature is added to only one of them or in which partial images the signature is added to different locations. The division of the image into partial images can take place by "cutting" part of the pixels to different partial images or by dividing the value of each pixel into parts (for example, the four most significant bits of each pixel into the first partial image and the rest of the bits into the second partial image) or in other ways. A person skilled in the art can easily present many suitable transformations. There are many algorithms and electric circuits on the market, by which various transformations and reverse transformations can be quickly and easily calculated for the images, and thus the more advanced embodiment of the invention does not make the implementation of the invention substantially more complicated.

One variation, which makes the authentication coding according to the invention more resistive against the disappearance of information caused by the packing algorithms of the image files, is oversampling of the signature before it is added by filtering to the original image or the transformed image obtained by transformation. Oversampling means increasing the pixel division of the signature. If a two-dimensional signature is double oversampled both vertically and horizontally, each original pixel of the signature become four pixels with equal value. In other words, the original signature is duplicated into four copies, which are placed on the image to be authentication coded regularly in relation to one another or even independent of one another. Thus the likelihood that at least one copy of the signature becomes clearly visible when the authentication coding is to be detected, is very high. The rate of oversampling can be freely chosen by the person performing the authentication coding. If several copies of the signature are added to the same image, different filters can be used to add each copy. Then the copy of each signature can naturally be detected only by using the same filter that was used to add it to the image. When several copies are being added to the image, attention must be paid to avoid overlapping.

An important place of application for authentication coding of two-dimensional images is in digital image archives, which are connected to Internet or such another general data transfer network, and from which the users can select and copy any image files they want. The keeper of the image archive can protect the images in the archive by authentication coding according to the invention and, for example, send a program called "agent" to the data network to search automatically for other image files and test if an authentication coding made by the keeper of the image archive can be found in them. If a signature is found in an image file which has not been legally acquired by a legal agreement from the keeper of the image archive, it proves that the holder of the file has acquired the possession of it without permission. A single image on a www home page can also be authentication coded so that its unauthorized copying to other places in the data network could be detected. A browser program, which the legal owner of an authentication coded image or images uses to get other information from the data network, can be equipped with an authentication coding detection part, to which the user inputs information of the signature, filter and possible transformation used. Thus the owner of a certain image or images can—when finding a familiar image in the network—by pressing a key or clicking the mouse examine if it contains the owner's signature.

The above description concerned the application of the invention to the authentication coding of two-dimensional digital images shown in bit-map form. However, the invention can be extended to the processing of many types of electric signals. A video performance is a series of two-dimensional images shown rapidly in succession, and any one of them, or each of them, can be supplied with a signature as described above. On the other hand, a video performance can utilize the time dimension by making the filter used for authentication coding and its detection three-dimensional, whereby it uses certain pixels contained by two or more consecutive images, for example, as input data. The signal to be authentication coded and the signature and filter used in the authentication coding can also be one-dimensional: for example, a digital telephone signal, which is a series of temporally consecutive bytes. In this case, the signature can be a certain line of bits, of which the bytes corresponding to 1-bits (alternatively 0-bits) from a certain, regularly repeating sequence of telephone signal (for example, a speech frame corresponding to 20 ms of speech time) are selected for processing. The term "data part" mentioned above in connection with the general description of the invention means all the parts of the signal shown in electric form which can be identified and selected for processing as described above and the value of which can be changed by means of a certain filter.

The authentication coding of audio and video signals or other temporally continuous signals, in particular, shows that the signal need not be a certain file with limited size, as in the authentication coding of still images. By the method according to the invention, the authentication coding can be added to a temporally continuous signal at certain regular or irregular intervals. This property of the invention can be utilized for identifying an electric signal produced by a certain device (telephone, video camera, tape recorder etc.): the device can contain a scaled authentication coding circuit, to which a certain signature, a certain filter and when required, a certain transformation and its reverse transformation, characteristic of this device, have been permanently saved. At regular or irregular intervals, the authentication coding circuit separates a cycle from the sequence generated by the device, to which sequence it hides the signature in a manner according to the invention. Afterwards, the signal generated by the device can be sent to be analyzed by such a trusted person or persons who know the information saved in the sealed authentication coding circuit. By means of this information, the trusted person can prove which device was used to produce the signal.

FIG. 5 shows a diagram of a device for implementing the method according to the invention. The device has a microprocessor 500, which is equipped to read and write images or other signals from the storage blocks 501 and 502 and to carry out the signal processing operations required by the invention. The microprocessor also has a two-way data transfer connection to the storage blocks 503, 504 and 505, the first of which is intended for saving the filter used in the filtering, the second is intended for saving the data used as a signature, and the third is intended for saving the transformation T and its reverse transformation. A display unit 506 has also been connected to the microprocessor for conveying information to the user, and a keyboard 507, by which the user can control the operation of the device. It this were a sealed authentication coding circuit, the purpose of which is to operate in a certain larger device, certifying the origin of the information produced by the device, the keyboard and display would not be needed, and the information of the filter, signature and transformation would be saved permanently in the storage blocks 503, 504 and 505. In this connection, sealing means any known arrangement by which the contents and operation of a certain electric circuit is protected so as to make unauthorized detection thereof difficult.

The user inputs to a device according to FIG. 5 the information of the filter, signature and transformation wanted by using the keyboard 507 or a corresponding data input device. In addition, the user enters a command, which means the authentication coding of an image file or another file. The file in question is then saved in the storage block 501. The microprocessor 500 reads the file to be authentication coded, transforms it according to the transformation T read from the storage block 505 and saves it in the storage block 502. It is thus advantageous to have two separate storage blocks 501 and 502, because if the transformation is interrupted or an error occurs during the process, the entire file is not destroyed but its original version remains saved in the storage block 501. Next, the microprocessor 500 reads the transformed file from the storage block 502 and saves it back to the storage block 501 so that it changes the values of the pixels or other data parts in a manner determined by the filter read from the storage block 503. Finally, the microprocessor reads the file again from the storage block 501, reversely transforms it and saves the authentication coded file in the storage block 502. The microprocessor informs the user of a successful completion of the authentication coding via the display 506.

When the user uses the keyboard to enter a command 507, meaning the detection of the authentication coding from the file saved in the storage block 502, the microprocessor reads the file, transforms it and saves the transformed file in the storage block 501. In the next step, it reads the transformed file from the storage block 501, filters it and forms a detection file in which the data parts which had their value unchanged during filtering, are marked. The detection file is saved in the storage block 502. The microprocessor forms a convolution of the detection file and signature, and saves the result in the storage block 501, in which result each data part of the detection file corresponds to an identification number, which depicts the suitability of the signature to the data part of the detection file. Finally, the microprocessor informs the user by the display 506 which the largest number is, where it is located and if, judging from it, it is likely that the file has been found to be authentication coded, using the signature saved in the storage block 504. The microprocessor can also show the detection file graphically to the user on the display 506, whereby the user can visually determine whether the signature has been found in the file.

It is clear to a person skilled in the art that the embodiments of the invention described above are presented by way of example only, and that it is possible to make obvious changes to them without departing from the scope defined by the claims presented hereinafter.

References:

I. Pitas, T. H. Kaskalis, "Applying Signatures on Digital Images", 1995 IEEE Workshop on Nonlinear Signal and Image Processing, Volume I of II, pp. 460–463, IEEE, Halkidiki, Greece, 1995

E. Koch, J. Zhao, "Towards Robust and Hidden Image Copyright Labeling", 1995 IEEE Workshop on Nonlinear Signal and Image Processing, Volume I of II, pp. 452–455, IEEE, Halkidiki, Greece, 1995

O. Bruyndonckx, J. -J. Quisquater, B. Macq, "Spatial Method for Copyright Labeling of Digital Images", 1995 IEEE Workshop on Nonlinear Signal and Image Processing, Volume I of II, pp. 456–459, IEEE, Halkidiki, Greece, 1995

M. D. Swanson, B. Zhu, A. H. Tewfik, "Robust Data Hiding for Images", Proceedings of the 1996 IEEE Digital Signal Processing Workshop, pp. 37–40, IEEE, Loen, Norway, 1996

I. Pitas, "A Method for Signature Casting on Digital Images", Proceedings of ICIP-96, Volume III, pp. 215–218, IEEE, 1996

R. B. Wolfgang, E. J. Delp, "A Watermark for Digital Images", Proceedings of ICIP-96, Volume III, pp. 219–222, IEEE, 1996

C. -T. Hsu, J. -L. Wu, "Hidden Signatures in Images", Proceedings of ICIP-96, Volume III, pp. 223–226, IEEE, 1996

M. Schneider, S. -F. Chang, "A Robust Content Based Digital Signature for Image Authentication", Proceedings of ICIP-96, Volume III, pp. 227–230, IEEE, 1996

A. G. Bors, I. Pitas, "Image Watermarking Using DCT Domain Constraints", Proceedings of ICIP-96, Volume III, pp. 231–234, IEEE, 1996

S. Roche, J. -L. Dugelay, R. Molva, "Multi-Resolution Access Control Algorithm Based on Fractal Coding", Proceedings of ICIP-96, Volume III, 235–238, IEEE, 1996

J. J. K. Ó Ruanaidh, W. J. Dowling, F. M. Boland, "Phase Watermarking of Digital Images", Proceedings of ICIP-96, Volume III, pp. 239–242, IEEE, 1996

H. Kinoshita, "An Image Digital Signature System with Zkip for the Grapf Isomorphism", Proceedings of ICIP-96, Volume III, pp. 247–250, IEEE, 1996 I. J. Cox, J. Kilian, T. Leighton, T. Shamoon, "Secure Spread Spectrum Watermarking for Images, Audio and Video", Proceedings of ICIP-96, Volume III, pp. 243–246, IEEE, 1996

H. Dedieu, M. Hasler, M. Bouslami, "Invisible Signatures in Images Based on Non-linear Dynamical Systems", 1995 International Symposium on Nonlinear Theory and its Applications, pp. 163–166, Las Vegas, USA, 1995

S. Craver, N. Memon, B. -L. Yeo, M. Yeung, "Can Invisible Watermarks Resolve Rightful Ownerships?", IBM Research Report RC 20509, IBM, 1996.

What is claimed is:

1. A method for hiding an authentication code (101, 402, 504) in an electric signal (100, 400, 401) representing pixel values, wherein the pixel values are selected from the electric signal for processing on the basis of the contents of the authentication code, characterized in that the value of each pixel value selected for processing is re-determined by a filter (200, 403, 503), which uses as filter input only pixel values of the electric signal from predetermined pixels.

2. A method according to claim 1, characterized in that said electric signal (100, 400, 401) is a file and its pixel values are bytes.

3. A method according to claim 2, characterized in that said file is an image file.

4. A method according to claim 1, characterized in that said electric signal (100, 400, 401) is a temporally continuous signal and its pixel values are bytes, whereby a certain temporal period is separated from the temporally continuous signal and the authentication code is hidden in said separated signal period.

5. A method according to claim 4, characterized in that the authentication code is repeatedly hidden in the same temporally continuous signal.

6. A method according to claim 1, characterized in that a deterministic transformation (T, 505) is also carried out on said electric signal before the pixel values are selected for processing, and a reverse transformation ($T^{-1}$, 505) of said deterministic transformation is carried out on the transformed electric signal after the value of each pixel value selected for processing has been specified anew.

7. A method for detecting the authentication coding from an electric signal representing pixel values, characterized in that in it the electric signal is filtered with a predetermined filter (403), the pixel values (406) which have their value unchanged during filtering are marked, and the marked pixel values are compared to a predetermined signature (402).

8. A method according to claim 7, characterized in that a predetermined deterministic transformation (T) is also carried out on said electric signal before it is filtered.

9. A device for hiding the authentication code in an electric signal representing pixel values, wherein said device comprises a memory (501, 502) for saving said electric signal, and a processing unit (500) for reading the electric signal from the memory and for selecting certain pixel values for the electric signal for processing on the basis of the authentication code, characterized in that it comprises a filter (503), and said processing unit is arranged to re-determine the value of each pixel value selected for processing in a manner specified by said filter.

10. A device for detecting the authentication coding from an electric signal representing pixel values, wherein said device comprises a memory (501, 502) for saving the electric signal and a processing unit (500) for reading the electric signal from the memory and for changing the value of its pixel values, characterized in that it comprises a filter (503), and said processing unit is arranged to re-determine the value of the pixel values of the signal in a manner specified by said filter and to save the information of those pixel values which have their value unchanged during filtering.

11. A device according to claim 10, characterized in that it also comprises an input device (507) for receiving the input data from the user and an output device (506) for conveying information about the operation to the user.

12. A device according to claim 10, characterized in that it is a sealed authentication coding circuit.

13. A device according to claim 9, characterized in that it also comprises an input device (507) for receiving the input data from the user and an output device (506) for conveying information about the operation to the user.

14. A device according to claim 9, characterized in that it is a sealed authentication coding circuit.

* * * * *

UNITED STATES PATENT AND TRADEMARK OFFICE
CERTIFICATE OF CORRECTION

PATENT NO.      : 6,094,722                                    Page 1 of 1
DATED           : July 25, 2000
INVENTOR(S)     : Astola et al.

It is certified that error appears in the above-identified patent and that said Letters Patent is hereby corrected as shown below:

[INID 56]      "Foreign Patent Documents", please insert:
-- 62 2114484           9/87    Japan --

Signed and Sealed this

Twenty-eighth Day of August, 2001

Attest:

*Nicholas P. Godici*

NICHOLAS P. GODICI
*Attesting Officer*      *Acting Director of the United States Patent and Trademark Office*